UNITED STATES PATENT OFFICE.

MARTHA P. JEWETT, OF EVANSVILLE, INDIANA.

COMPOSITION OF MATTER TO BE USED FOR THE PURPOSE OF FLUXING METALS.

977,406. Specification of Letters Patent. Patented Nov. 29, 1910.

No Drawing. Application filed March 1, 1910. Serial No. 546,630.

*To all whom it may concern:*

Be it known that MARTHA P. JEWETT, a citizen of the United States, residing at Evansville, county of Vanderburgh, and State of Indiana, has invented a certain new and useful Composition of Matter to be Used for the Purpose of Fluxing Metals, thus Purifying them for Commercial Use, of which the following is the specification.

My composition consists of the following ingredients combined in the proportions stated.

*Formula No. 1.*—Fluor spar 55%, clay (red gossan) 35%, dolomite 10%. Colored with carbon or uncolored.

*Formula No. 2.*—Fluor spar 50%, clay (red gossan) 36 4/10%. Colored with carbon or uncolored.

*Formula No. 3.*—In bulk or manufactured in bricks. Fluor spar 80%, clay (red gossan) 10%, carbonate zinc 5%, dolomite 5%, one (1) pound oxid manganese to every 500 pounds. Colored with carbon or uncolored.

*Formula No. 4.*—Fluor spar 30%, clay (red gossan) 10%, carbonate of zinc 10%, oxid of manganese 8 to 9 pounds per bbl. Colored with carbon or uncolored.

*Formula No. 5.*—Fluor spar 33 1/3%, red gossan (clay) 33 1/3%, dolomite 33 1/3%, oxid of manganese 2 pounds to every 57 pounds.

These ingredients are thoroughly mixed by agitation. After they are thoroughly mixed they can be used for every variety of service in foundry or other smelting practice or process, and may be handled either in bulk or manufactured into bricks convenient for shipping. These compositions above stated are used in the cupola in practically the same manner as are other compositions for accomplishing the same results.

I claim:

Fluor spar, clay, and dolomite, as a composition of matter.

In testimony whereof, I hereunto affix my signature in presence of two witnesses.

MARTHA P. JEWETT.

Witnesses:
F. C. GORE,
P. M. GATCH.